United States Patent
Lahat et al.

(10) Patent No.: US 6,466,343 B1
(45) Date of Patent: Oct. 15, 2002

(54) SYSTEM FOR ASSIGNING WAVELENGTHS IN A WAVE DIVISION MULTIPLEXING BASED OPTICAL SWITCH

(75) Inventors: Amir Lahat, Kibbutz Givat-Brenner; Offer Pazy, Tel Aviv, both of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/300,885

(22) Filed: Apr. 28, 1999

(51) Int. Cl.[7] .......................... H04J 14/02; H04J 14/08

(52) U.S. Cl. .................................. 359/128; 359/139

(58) Field of Search .................. 359/117, 128, 359/139, 124

(56) References Cited

U.S. PATENT DOCUMENTS

| | | | | |
|---|---|---|---|---|
| 5,293,488 A | * | 3/1994 | Riley et al. | 395/200 |
| 5,307,342 A | * | 4/1994 | Georgiou et al. | 370/58.1 |
| 5,483,536 A | | 1/1996 | Gunji et al. | 370/85.14 |
| 5,550,818 A | | 8/1996 | Brackett et al. | 370/60 |
| 5,566,014 A | | 10/1996 | Glance | 359/124 |
| 5,576,875 A | | 11/1996 | Chawki et al. | 359/125 |
| 5,617,233 A | | 4/1997 | Boncek | 359/125 |
| 5,625,478 A | | 4/1997 | Doerr et al. | 359/125 |
| 5,760,934 A | | 6/1998 | Sutter et al. | 359/119 |
| 5,920,412 A | | 7/1999 | Chang | 359/128 |
| 5,930,016 A | | 7/1999 | Brorson et al. | 359/127 |
| 6,078,415 A | * | 6/2000 | Yamamoto et al. | 359/128 |
| 6,141,126 A | * | 10/2000 | Lahat et al. | 359/121 |
| 6,233,074 B1 | * | 5/2001 | Lahat et al. | 359/118 |
| 6,295,146 B1 | * | 9/2001 | Nathan et al. | 359/119 |

FOREIGN PATENT DOCUMENTS

| | | | | |
|---|---|---|---|---|
| DE | 43 37 089 A1 | 4/1995 | | H04B/10/20 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, AddisonWesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

Chang, G. et al., "Multiwavelength Reconfigurable WDM/ATM/SONET Network Testbed", *Journal of Lightwave Technology*, vol. 14, No. 6, Jun. 1996.

(List continued on next page.)

*Primary Examiner*—Leslie Pascal
*Assistant Examiner*—Dalzid Singh
(74) *Attorney, Agent, or Firm*—Howard Zaretsky

(57) ABSTRACT

A system for assigning wavelengths in an optical switch to enable unicast, broadcast and multicast traffic to be sent through the switch. The optical switch enables data to be switched in the optical domain as opposed to conventional switching in the electrical domain. This permits a very high data capacity and data rate using well-known WDM technology. Tunable transmitters are configured to connect each input port to a different output port within the switch. During each cycle of the switch the transmitters are programmed to a particular wavelength, the wavelength determining the destination output port. Interface (I/F) cards issue requests to send data to the switch and receive acknowledgements indicating permission to send data to a particular destination port. A controller processes the requests received from the I/F card to generate a set of acknowledgements. A two-way round robin technique is used to select the destination ports for each I/F card based on the requests received.

15 Claims, 4 Drawing Sheets

OTHER PUBLICATIONS

Oguchi, K., "Novel Wavelength–Division–Multiplexed Ring Network Architecture Usin Optical Path Technology for Mulitple Services and Simple Media Access Control Procedure", *Fiber and Integrated Optics*, 16: pp. 159–180, 1997.

Karol M., "Exploiting the Attenuation of Fiber–Optic Passive Taps to Create Large High–Capacity LAN's and MAN's", *Journal of Lightwave Technology*, vol. 9, No. 3, Mar. 1991.

* cited by examiner

SYSTEM FOR ASSIGNING WAVELENGTHS IN A WAVE DIVISION MULTIPLEXING BASED OPTICAL SWITCH

FIELD OF THE INVENTION

The present invention relates generally to data communications networks and more particularly relates to a system for assigning wavelengths in an optical switch capable of handling unicast, broadcast and multicast data traffic.

BACKGROUND OF THE INVENTION

More and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Current LAN Topology

Using ATM network technology as an example, the current topology of high performance ATM local area networks (LANs) includes ATM core switches at the backbone and an edge device having an ATM downlink to the one or more core switches. When a connection is established between two edge devices, the traffic must pass through the ATM switches in the core. Therefore, in order to support all potential connections between all edge devices, the ATM switches at the core need to be non blocking. Non blocking ATM switches are difficult to develop and thus are much more expensive.

In addition to the above disadvantage, the resulting network may be limited in bandwidth. When attempting to establish large numbers of connections from the. edge device, there may be a need for faster downlink data rates. Depending on the number of connections and the throughput required for each connection, the downlink capacity might not be sufficient to meet the needs of users.

An additional disadvantage is the amount of physical wiring required to implement such a network. In practice, each edge device must be connected to the ATM core via physical wires (i.e., cables). When considering a typical office building there may be many wires installed in parallel. A separate cable from each edge device on each floor must be run down to the ATM core farm that typically is located in the basement. Wherever the switch core farm or server farm is located, cables must be run from the switch core farm to each edge device. The total length of the required cabling can be relatively very high and thus have an associated very high cost.

The cost may be even higher depending on the type and length of cabling used. For example, in ATM networks, it is common to run high speed fiber optic cable from the ATM switch core to all the edge devices in the network. Data rates may range from OC-3 155 Mbps to OC-12 622 Mbps on the optical fiber, for example. Note that each optical fiber used in the network carries only a single communication channel using a single wavelength of light. If it is desired to maintain several communications channels at one time, more than one optical fiber is required. Using prior art transmission techniques, each communication channel requires a separate optical fiber.

Today, most legacy local area networks utilize ATM technology in combination with Switched Ethernet or Token Ring network topologies. The existing switching technology enables each user on the network to have their own dedicated bandwidth, e.g., 10 Mbps or 100 Mbps, for their networked software applications. Each user is given network connectivity to the local switched hub, e.g., 100 Mbps for a Fast Ethernet network interface card (NIC). In typical office building environments, each floor is provided with one or more switched hubs that users are directly connected to. If the switched hub has sixteen 10 Mbps ports than it may potentially be forced to handle 1,600 Mbps data rate from all the connected users.

Currently available conventional technology, using electrical processing, forces the switched hub to analyze every bit of information and to determine its destination. Even in the event that most of the data is not switched between the local ports on the switch but rather is passed up to higher levels of switching, all the information must still be analyzed by the switched hub. This bottleneck for data that is not switched locally leads to high data rates within the switch. The high internal data rates result in a more complicated design in terms of both hardware and software, thus increasing the cost of the switch.

A networking strategy commonly used today is to use an all Ethernet network comprising a plurality of switches (switching hubs) connected to a network backbone. Each floor in the enterprise has one or more switched hubs connected to end users. Each switch comprises a port interface section, switch section and an interface that is typically at a higher speed that the port interfaces. A plurality of ports connects the end users to the switch.

Each switch on each floor is connected via a dedicated physical cable to the network backbone. The network backbone comprises one or more switches connected in some arrangement. In addition, the switches or other network equipment from one or more other buildings may be connected to this network. An example of a suitable workstation Ethernet switch is the LinkSwitch 2700 manufactured by 3Com Corporation, Santa Clara, Calif.

Each end user on the network is connected to a port in one of the switches at a rate of either 10 or 100 Mbps. The link between each switch and the network backbone may be over fiber optic cable at Fast Ethernet or 1 Gbps data rates, for example. Alternatively, the downlinks from each of the switched hubs to the network backbone can be a protocol other then Ethernet, such as ATM, FDDI, etc. For example, the interface portion may comprise an ATM interface, FDDI interface, etc. If a protocol other then Ethernet, e.g., ATM, is used on the downlinks from the switched to the network backbone, than some form of local area network emulation (LANE) must be used to provide Ethernet connectivity between end users.

In many cases, the protocol in use on the downlinks will differ from the protocol used on the connections to the end users, e.g., 10 Mbps to the end users and ATM on the downlinks. It is important to note, however, that regardless of the protocol used on the downlinks, a separate cable (optical fiber or copper) is required from each switched hub to the network backbone.

This commonly used network topology has several disadvantages. One disadvantage is that depending on the length and type of cabling used, the cost could end up being quite high. In addition, depending on the number of switches used in the network, the number of individual fiber optic cables could be very high. Another disadvantage is that the bandwidth available from each floor to the network backbone is limited. For example if fast Ethernet 100 Mbps is used, that the maximum bandwidth available to the switch is 100 Mbps, no more.

Also, another disadvantage is that the only type of connections possible using such a network topology are point to point connections. Multicast (MC) connections are possible but they are not simple or trivial to implement. Multicast connections require large amounts of overhead to implement whereby each call must be routed through the network backbone. Multicast connections also require special call setup procedures that can be potentially draining on system resources if the number of connections is large.

Another disadvantage is that the network backbone must be used to establish many of the connections. The connections that must be routed through the backbone include any connection between two different switches.

Wave Division Multiplexing

Wave division multiplexing (WDM) technology enables the simultaneous transmission of multiple data channel connections on the same physical optical fiber. This is achieved by utilizing several different wavelengths on the same optical fiber at the same time. The WDM transmission network comprises a plurality of optical transmitters, a wave division multiplexor, optical transmitter, optical fiber transmission line, optical receiver, wave division demultiplexor and a plurality of optical receivers.

Using this type of network, several data sources can be sent simultaneously into the WDM mux whereby each data source uses a different wavelength. The optical WDM mux functions to combine the different wavelengths into one optical transmission light beam. This optical light beam is transmitted onto the optical fiber using the optical transmitter. The fiber carries all the connections simultaneously. The optical light beam reaches the optical receiver that outputs the light beam to the WDM demux. The WDM demux functions to split the optical light beam into the different wavelengths that were originally sent. The different wavelength outputs of the WDM demux are input to the individual receivers that convert the light energy into electrical signals.

Currently, the major use of WDM technology is in Wide Area Network (WAN) applications. The majority of WANs installed already have a large installed base of optical fiber. The optical fiber installed in WANs typically carry very high data rate traffic on the order of many gigabits per second. In addition, the demand for bandwidth and capacity is growing at an explosive rate. Today's WAN installations are being pushed to capacity in order to satisfy the demand for increasing levels of bandwidth.

Two different techniques can be used to transmit data at higher rates: (1) adding additional optical fibers or (2) to increase the rate of data at the edge devices on either end of the optical fiber. Both of these solutions are very costly: installing additional fiber optic cable is very costly and developing faster end equipment is difficult and expensive.

Currently available WDM technology, however, is a viable alternative to installing new fiber optic cable or upgrading the equipment on either end of the fiber. Using conventional WDM technology, several 'slow' conventional end devices can be connected to a WDM mux whereby several slower data sources are combined onto the same fiber and transmitted to the other end. At the far end of the fiber optic cable, the operation is reversed, i.e., the optical signal is optically WDM demuxed. Thus, WDM technology can be used as a bandwidth concentrator.

In a conventional switch, the assignment of a wavelength to an input data stream defines a specific path between an input port and an output port. In a broadcast connection, the data must be forwarded to all the ports. This means the transmitters must transmit on all wavelengths simultaneously, which is physically impossible. Further, in the case of a multicast connection, the problem is even more complicated. The transmitter port must transmit to a select group of ports wherein the members of the group are constantly changing. In the optical domain, this translates to sending multiple wavelengths simultaneously whereby the wavelengths are changing in random fashion, which is very difficult and impractical to achieve.

Further, in an optical switch, when assigning a wavelength to an input data port, the designated wavelength cannot be used by other inputs in order to prevent congestion at the output port. Since all the inputs can transmit to all the outputs in the switch, there is a need for a central entity that assigns the wavelengths to the input ports in such a manner that the congestion problem is addressed while the data traffic does suffer from overloading of the buffers.

SUMMARY OF THE INVENTION

Throughout this document the term wave division multiplexing (WDM) denotes using a single optical fiber to transmit several communications channels simultaneously whereby each channel transmits data utilizing a different wavelength of light. The term dense wavelength division multiplexing (DWDM) denotes WDM that utilizes several wavelengths of light that are relatively close to one another.

The type of environment suitable for application of the present invention is any data communications network such as. found on college campuses or other large enterprises. Many companies that currently implement data networks with backbones using switched Ethernet and/or ATM technology can benefit from the features of the present invention. The optical switching system of the present invention, in combination with wave division multiplexing, provides a novel solution to the problems of the prior art described above.

The present invention utilizes WDM or DWDM technology to construct an optical switch suitable for use in both WAN and LAN environments. Devices are connected to the optical switch via a physical interface (I/F) module or card. The output of the I/F card is input to the switch and assigned a separate wavelength via a tunable electrical to optical transmitter. The output of all the transmitters are input to a star coupler which combines all the optical signals into a single optical output signal. This signal, in turn, is input to an optical demultiplexor which functions to split the incoming optical signal into a plurality of separate wavelengths with each wavelength steered to a particular output port. The output of each port, corresponding to a particular wavelength, is then converted into an electrical signal by an optical to electrical receiver. This first embodiment of the switch supports unicast connects. A controller configures the tunable transmitters to a particular wavelength in accordance with the desired output port for that input.

A plurality of unicast connections can be established simultaneously by assigning each tunable transmitter a different wavelength such that all wavelengths are mutually exclusive with each other. No two transmitters are tuned to the same wavelength at the same time. This prevents the unicast connections from overlapping with each over in the switch.

In a unicast connection, only the two end nodes transmit or receive the optical signals on the particular wavelength assigned to the connection. In a second embodiment of the optical switch, broadcast and multicast connections are handled. In a broadcast connection, the source node transmits and all output ports receive the optical signal on the particular wavelength assigned to that port. One port transmits data while the rest of the input ports are placed in an idle state. The output of each port is input to a multiplexor along with an output of the optical demux dedicated to broadcast traffic. A controller switches the multiplexors to output the broadcast signal such that all receivers output the same signal.

Multicast traffic is handled similarly except that rather than switch all the multiplexors to the dedicated multicast signal, only selected multiplexors are switched. The remaining multiplexors carry unicast traffic as normal. As a result, the output ports of the members of the multicast group all output the same signal.

The invention also comprises a system for assignment of wavelengths to each of the tunable transmitters. For each unit of data, i.e., packet, frame, cell, etc., to be transmitted, the I/F card sends a request to the switch module. A central control unit in the switch module processes the requests from all I/F cards in parallel and sends acknowledgement (ACK) data to each I/F card. The ACK includes the available wavelength to be used by that particular I/F card during the next time slot or data cycle. The system comprises means for handling unicast, broadcast and multicast traffic.

There is provided in accordance with the present invention a wavelength assignment apparatus for use in an optical switching matrix, the optical switching matrix having N input ports and N output destination ports, each input port having a corresponding interface (I/F) card coupled thereto, the apparatus comprising a controller adapted to receive requests from the N I/F cards, each request indicating that an I/F card has data ready to input to the switching matrix, the controller adapted to output acknowledgements to the N I/F cards, each acknowledgement indicating the designated wavelength and destination port assigned to the I/F card, a request map table for storing the plurality of requests received from the I/F cards, a bit being set in the request map table to indicate a request for an I/F card to send data to a particular destination port, a processing map table for temporarily holding the current state of the request map table, the contents of the request map table periodically being copied to the processing map table and the controller operative to assign the destination ports to the I/F cards such each I/F card is assigned no more than one destination port and each destination port is assigned to no more than one I/F card.

The request map table and the processing map table comprise tables N rows by N columns and the controller is adapted to receive the requests via a request bus N bits wide, each bit indicating a different destination port or the controller can be adapted to receive the requests via a request bus $\log_2 N$ bits wide, each request indicating the number corresponding to a destination port. In addition, the controller is adapted to perform a two way round robin selection in assigning destination ports to the I/F cards.

There is also provided in accordance with the present invention a wavelength assignment apparatus for use in an optical switching matrix, the optical switching matrix having N input ports and N output destination ports, each input port having a corresponding interface (I/F) card coupled thereto, the apparatus comprising a controller adapted to receive requests from the N I/F cards, each request indicating that an I/F card has data ready to input to the switching matrix, the controller adapted to output acknowledgements to the N I/F cards, each acknowledgement indicating the designated wavelength and destination port assigned to the I/F card, a request map table for storing the plurality of requests received from the I/F cards, a bit being set in the request map table to indicate a request for an I/F card to send data to a particular destination port, a processing map table for temporarily holding the current state of the request map table, the contents of the request map table periodically being copied to the processing map table, the controller operative to assign the destination ports to the I/F cards such each I/F card is assigned no more than one destination port and each destination port is assigned to no more than one I/F card for unicast connections, broadcast means adapted to assign a single I/F card a broadcast slot while preventing all other I/F cards from sending any data to the destination ports and multicast means adapted to assign a multicast slot comprising a plurality of destination ports to a single I/F card while permitting any remaining destination ports to be assigned to other I/F cards.

The request map table and the processing map table comprise tables N rows by N+2 columns, the N+1$^{th}$ column representing a broadcast column and the N+2$^{nd}$ column representing a multicast column. The controller is adapted to receive the requests via a request bus N+1 bits wide, N bits indicating a different destination port with the N+1$^{th}$ bit indicating a broadcast/multicast request or the controller is adapted to receive the requests via a request bus log$_2$N bits wide, each request indicating the number corresponding to a destination port. The controller is also adapted to receive a multicast bit map representing destination ports to be included in a multicast group, perform a two way round robin selection in assigning destination ports to the I/F cards and to assign weights to the destination ports and to requests for broadcast and multicast connections.

There is further provided in accordance with the present invention, in an optical switching matrix having N input ports and N output destination ports, each input port having a corresponding interface (I/F) card coupled thereto, a method for assigning wavelengths to the input ports, the method comprising the steps of receiving one or more requests from the I/F cards and storing them in a request map table, a bit being set in the request map table to indicate a request for an I/F card to send data to a particular destination port, periodically copying the contents of the request map table to a processing map table, assigning a destination port to each requesting I/F card such each I/F card is assigned no more than one destination port and each destination port is assigned to no more than one I/F card and removing the request for a particular destination port once being assigned to an I/F card.

The step of assigning a destination port to each requesting I/F card comprises the steps of performing a two way round robin technique through the columns and then rows of the processing map table to search for set bits and clearing the remaining bits in the particular row and column once a set bit is found so as to prevent the same destination port from being assigned to another I/F card.

The step of removing the request for a particular destination port comprises the step of clearing a bit in the request map table corresponding to the destination port assigned to a particular I/F card.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ACK | Acknowledge |
| ANSI | American National Standards Institute |
| ATM | Asynchronous Transfer Mode |
| BC/MC | Broadcast/Multicast |
| CCITT | Comite Consulatif International Telegraphique et Telephonique |
| DWDM | Dense Wavelength Division Multiplexing |
| FDDI | Fiber Distributed Data Interface |
| I/F | Interface |
| I/O | Input/Output |
| IP | Internet Protocol |
| ITU | International Telecommunications Union |
| LAN | Local Area Network |
| LANE | LAN Emulation |
| MC | Multicast |
| NIC | Network Interface Card |
| OC | Optical Carrier |
| REQ | Request |
| TCP | Transmission Control Protocol |
| UNI | User to Network Interface |
| WAN | Wide Area Network |
| WDM | Wavelength Division Multiplexing |

Optical Switching Matrix

The present invention is a system for assigning wavelengths in an optical switch such that unicast, broadcast and multicast traffic are enabled. The optical switch enables data to be switched in the optical domain as opposed to conventional switching in the electrical domain. This permits a very high data capacity and data rate. The switch is based on well-known WDM technology. The electrical inputs to the switching matrix are converted into optical signals on pre-assigned wavelengths. Each wavelength is dedicated to a specific optical output port. The sum of all the optical signals is broadcast towards each destination port. A WDM demux filters the signals such that each output only receives an optical signal having a specific wavelength. Unicast traffic is directed from a specific input port to a specific output port. Broadcast traffic is broadcast to all the output ports and multicast traffic is directed to a selected group of output ports.

Figure 1:
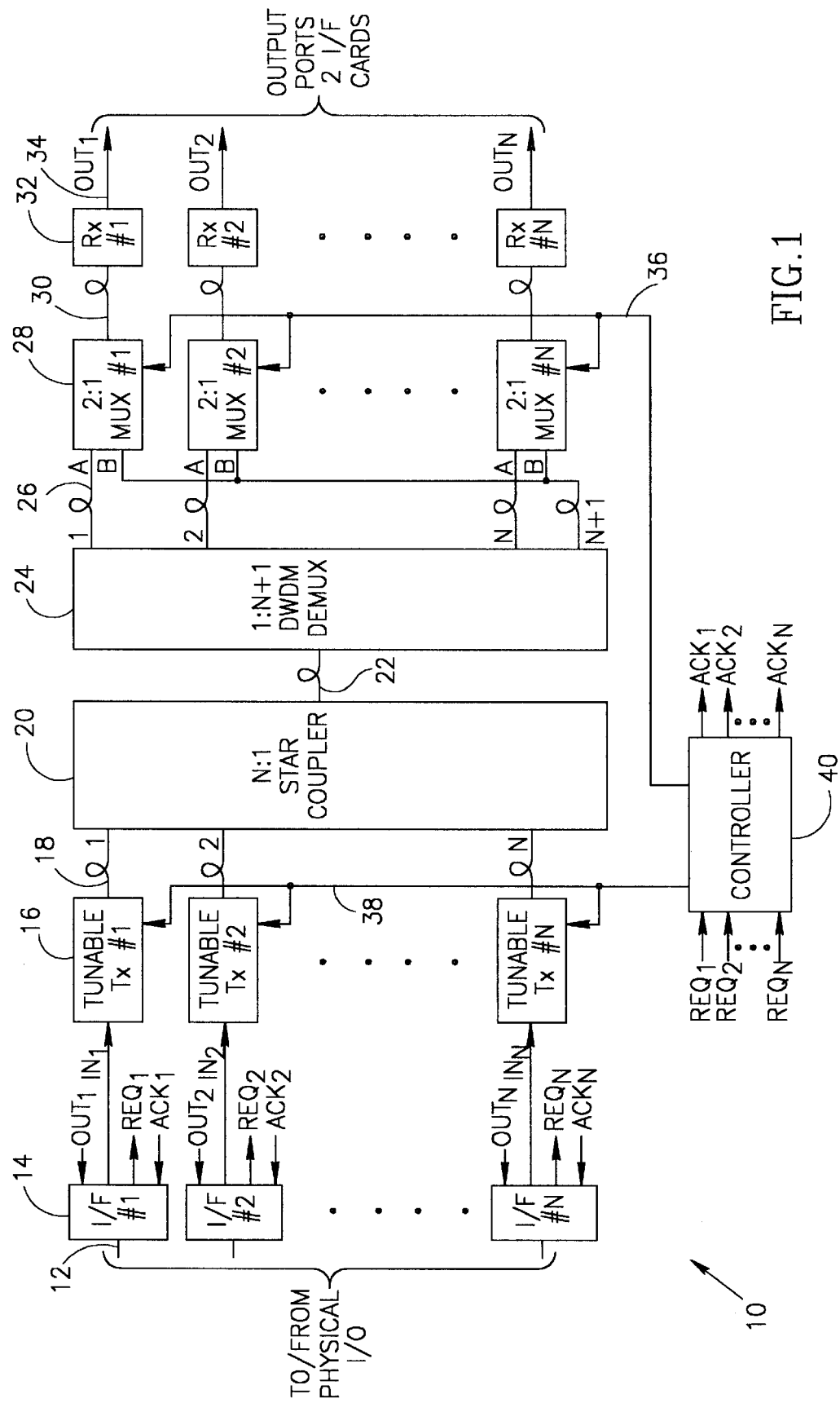
FIG. 1 is a block diagram illustrating an example embodiment of an optical switching core constructed in accordance with the present invention capable of handling unicast, broadcast and multicast traffic.

The present invention comprises an optical switching matrix that enables unicast, broadcast and multicast traffic to be switched. A block diagram illustrating an example embodiment of an optical switching core constructed in accordance with the present invention is shown in FIG. 1. The switching matrix, generally referenced 10, is suitable for handling unicast, broadcast and multicast connections. At any one time, for unicast transmission, the tunable transmitters are configured to connect each input port to a different output port. During each cycle of the switch, i.e., each cell time or other cycle time, the transmitters 16 are programmed to a particular wavelength, the wavelength determining the destination output port.

The physical I/O channels 12 are coupled to the switch matrix 10 via a plurality of interface (I/F) cards 14 layer labeled I/F card #1 through I/F card #N. For example, each I/F card comprises two outputs and two inputs. The two outputs comprise a data signal that is input to the switching matrix, IN$_N$ and a REQ$_N$ signal that is input to the controller 40. The two inputs comprise a data signal that is output from the switching matrix $OUT_N$ and an $ACK_N$ signal output from the controller 40.

The switching matrix also comprises a plurality of tunable transmitters 16 labeled tunable Tx #1 through tunable Tx #N. The $IN_N$ signals from the plurality of I/F cards 14 are input to each tunable Tx. The tunable transmitters 16 function to convert the electrical input signal to an optical output signal 18. The wavelength of each transmitter is set by the controller 40 via control bus 38. The controller functions to set the wavelengths such that no two transmitters are set to the same wavelengths simultaneously.

Each optical transmitter 16 functions to convert electrical signals into optical signals. The enabling and disabling of each optical transmitter 16 can optionally be controlled by the controller 40. The Optical Transmitter Module part number NYW-40 ITU Laser, manufactured by Altitun AB, Kista, Sweden, is suitable for use with the present invention. Note that each transmitter is tuned so as to generate an optical signal having a specific wavelength.

The outputs of the tunable transmitters 16 are input to an N to 1 star coupler (WDM mux) 20 via optical fibers 18. Each of the N optical signals output of the plurality of transmitters 16 are input to one of the inputs ports of the N to 1 star coupler or WDM mux 20. The WDM mux functions to combine the N optical input channels into a single egress optical output channel. Each of the N optical input signals, each having a different wavelength, i.e., $\lambda_1, \lambda_2 \ldots \lambda_{N+1}$, are combined into a single optical signal. A suitable 16 to 1 optical WDM mux is the 16 channel narrow band Dense WDM mux model WD15016-M2 manufactured by JDS Fitel, Inc., Ontario, Canada. Optical channel spacings on the order of 200 GHz can be achieved with this dense WDM mux device.

The output of the star coupler is input to a 1:N+1 WDM demux 24 via optical fiber 22. The demux 24 functions to demultiplex the N+1 wavelengths into N+1 individual output ports whereby each output port is dedicated to a particular wavelength. The optical signal input to the demux 24 is split into N+1 different optical signals each having a different wavelength, i.e., $\lambda_1, \lambda_2 \ldots \lambda_{N+1}$. In accordance with the invention, the demux 24 comprises an additional output channel having a dedicated unique wavelength. The first N channels correspond to the N input ports and the N+1$^{th}$ channel corresponds to the broadcast/multicast channel. A suitable 1 to 16 optical WDM demux is the 16 channel narrow band Dense WDM demux model WD15016-D2 manufactured by JDS Fitel, Inc., Ontario, Canada. Optical channel spacings on the order of 200 GHz can be achieved with this dense WDM demux device.

The optical output signal from channels 1 through N are input to 2 to 1 optical multiplexors 28 via optical fibers 26. Each mux 28 comprises two input ports, A and B, and an output port. The A input port of each mux 28 is coupled to one of output ports 1 through N of the WDM demux 24. The B input port of each mux 28 is coupled to the output of channel N+1 of the demux 24. In accordance with an input control signal, each 2 to 1 mux 28 outputs either the optical signal output from channels 1 through N or the output from channel N+1, i.e., the broadcast/multicast channel. A suitable 2 to 1 switch that can be used to construct the switch matrix 10 is the SL, SR or SW series of Fiber Optic Switch Modules manufactured by JDS Fitel, Inc., Ontario, Canada.

For unicast transmission, all the muxes 28 are configured by the controller 40 via control bus 36 to couple their respective A inputs to the output. For broadcast transmission, the controller 40 configures each mux 28 to couple its respective B input, i.e., the broadcast/multicast wavelength, to the output. While the switch is configured for broadcast, no unicast traffic can flow for that cycle.

The optical output of each mux 28 is input to an optical receiver 32 via optical fibers 30. The receivers 32 are labeled Rx #1 through Rx #N. Each receiver 32 functions to convert an optical input signal to an electrical output signal 34. Optionally, a control signal input from the controller 40 determines which of the channels in the plurality of optical receivers are enabled and which are disabled, to save power, etc. A suitable optical receiver module that can be used to construct a multichannel optical receiver is the PGR 5025 Optical Receiver Module manufactured by Ericsson Components AB, Kista-Stockholm, Sweden. Each of the receive channels is tuned to receive an optical signal on a specific wavelength.

The electrical signals $OUT_N$ output from the optical receivers 32 are input to the I/F cards for transmission over the physical I/O channels. In addition, the controller 40 is adapted to receive the N REQ signals from the N I/F cards 14 and to output the N ACK signals to the N I/F cards 14.

For broadcast transmission, one of the input ports is given permission to broadcast to all the output ports. This is achieved by setting the port's corresponding tunable transmitter 16 to the broadcast/multicast wavelength N+1. In addition, the controller must configure the plurality of 2 to 1 muxes 28 to couple the data at the B input to the output. This permits a single input port to transmit to all the output ports while the remainder of the ports are in the idle state. The transmitting port sends the data on a dedicated broadcast/multicast wavelength that is not used by any other output port. The signal having this wavelength is filtered by the WDM demux 24 and will appear at the output channel N+1. The 2 to 1 muxes are switched so as to couple the broadcast signal to their outputs. When the broadcast is finished, the muxes are switched back to their A input ports.

Multicast transmissions as handled in a similar manner with the difference being that not all the 2 to 1 muxes 28 are switched to their B inputs. Only the muxes 28 corresponding to members of the multicast group are switched to connect the broadcast/multicast signal to the output. The remaining muxes are left in the unicast mode. The controller 40 functions to configure the muxes in accordance with the destination ports making up the multicast group.

In operation, the controller 40 configures the tunable transmitter 16 that is associated with the input port wishing to send multicast data. That transmitter is configured to the wavelength corresponding to the N+1 broadcast/multicast channel on the WDM demux 24. In addition, the 2 to 1 muxes 28 that correspond to the members of the multicast group are configured to connect their B inputs to the output. The remaining muxes are left in unicast mode, i.e., the A input is connected to the output.

It is important to point out that although the switching matrix comprises N input ports and N output ports, the matrix utilizes N+1 unique wavelengths. The additional wavelength being used for the broadcast/multicast channel.

The switching matrix 10 shown in FIG. 1 provides a single broadcast/multicast channel. Switching matrices with additional broadcast/multicast channels can be constructed by adding additional wavelength channels to the WDM demux combined with using multiplexors having a larger number of inputs.

In general, a switching matrix comprising N unicast channels and M broadcast/multicast channels requires N tunable transmitters wherein each transmitter is tunable over N+M wavelengths. In addition, a 1 to N+M WDM demux is required in addition to N (M+1) to 1 muxes.

I/F Card Output Queues

Figure 2:
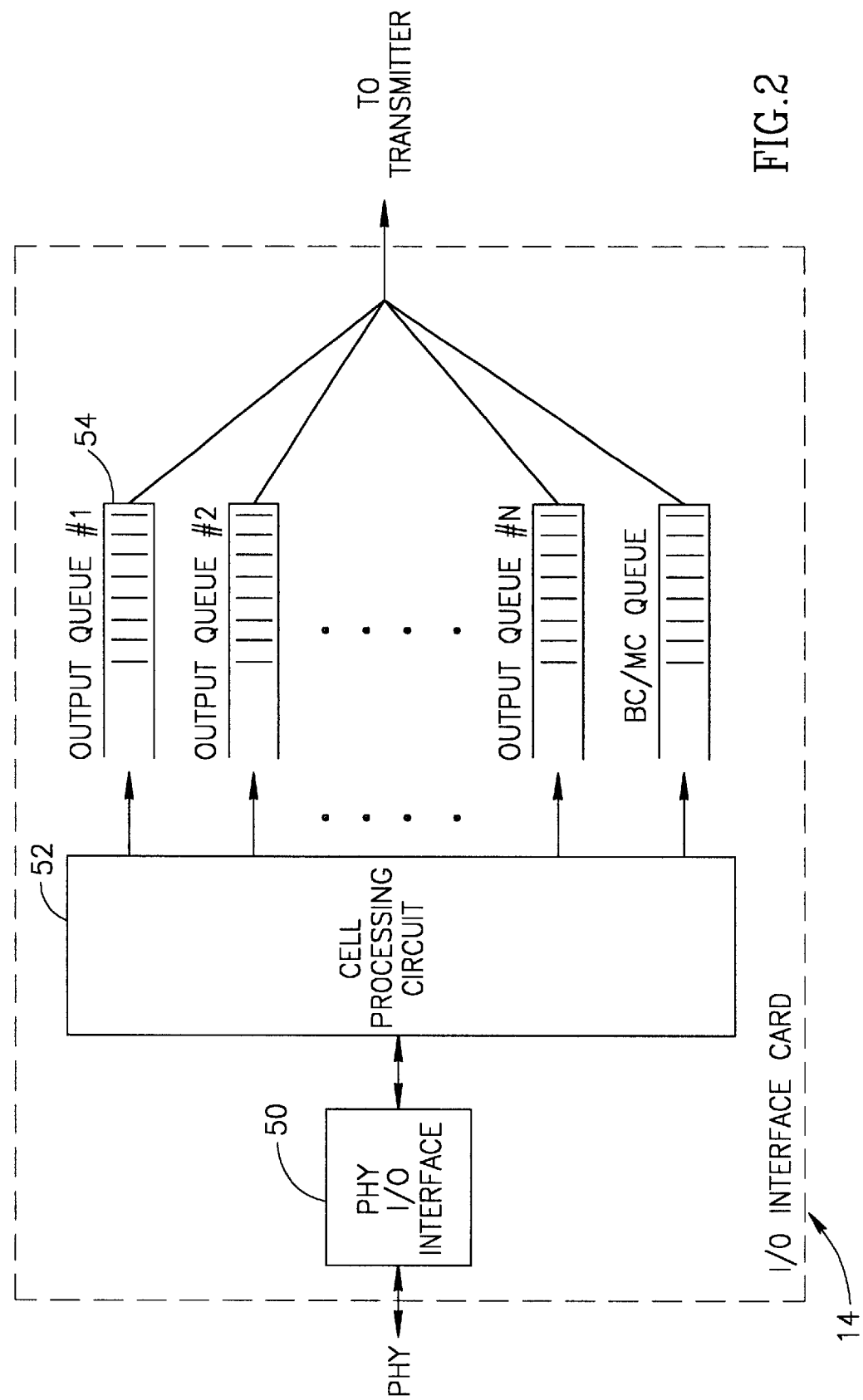
FIG. 2 is a block diagram illustrating the output queues within an I/O interface card of the switching matrix.

A block diagram illustrating the output queues within an I/O interface card of the switching matrix is shown in FIG. 2. Each I/F card 14 comprises an interface to the physical I/O channel 50. The signals output of the physical I/O interface 50 are coupled to a cell processing circuit 52 which functions to process the data destined to the ingress of the switching matrix and to process the data output from the egress of the switching matrix. The cell processing circuit, in accordance with the call connection information, determines a destination output port for data received over the physical I/O channel.

To aid in understanding the principles of the present invention, the plurality of output queues 54 within the I/F card is shown in more detail. The I/F card 14 comprises N output queues labeled output queue #1 through output queue #N. Each output queue corresponds to a unique destination output port. Each output queue functions to buffer data cells input from the physical I/O channel that are destined to the particular output port associated with the queue. In addition, the I/F card comprises a broadcast/multicast (BC/MC) queue for buffering broadcast and multicast data cells.

It is important to note that during each cycle of the switch matrix, only one output queue from each I/F card is permitted to send data to the ingress of the switch. For each cycle, an output destination is determined for an I/F card. In accordance with the selected destination, the corresponding output queue is enabled. In addition, the tunable transmitter coupled to the I/F card is configured with the wavelength corresponding to the destination port.

Figure 3:
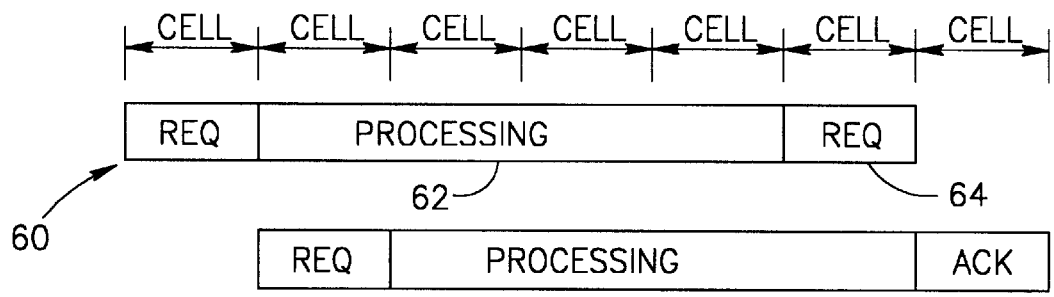
FIG. 3 is a block diagram illustrating the timing of the request, processing and acknowledgement phases of the central controller within the switching matrix.

In operation, the controller 40 within the switching matrix 10 functions to receive REQ signals from the N I/F cards. An I/F card asserts its REQ line when it has a cell to transmit to a destination port. The controller processes the requests and outputs a plurality of ACK signals back to the I/F cards. This sequence of request, processing and acknowledgement phases of the central controller is illustrated in FIG. 3. During each cycle of the switch, the REQ signals are read by the controller (time block 60). Subsequently, the controller processes the plurality of REQ signals (time block 62). Note that the controller can receive a maximum of N REQ signals each cycle, but may also receive fewer REQ signals. In this example, the processing performed by the controller, i.e., wavelength assignments, etc., takes 4 cycles to complete. Note that the above is meant only as an example, actual processing times may be longer or shorter depending on the implementation of the switch matrix. Following the processing phase, the controller outputs any ACK signals during the next cycle (time block 64). The ACK signals are received by the I/F cards and serve to instruct each card as to which destination port has been assigned (if any).

Alternatively, multicast can be indicated by setting the BC/MC bit, setting the destination port field 94 to zero and sending an additional N bit message wherein each bit corresponds to a destination port. A bit in the message is set to a one to indicate that the destination port is a member of the multicast group. Thus, only ports whose corresponding bit is set to one will receive the cell.

Wavelength Assignment

The method of wavelength assignment in the switching matrix will now be described in more detail. The assignment of wavelengths for each I/F card is performed using two bitmap tables that are maintained and manipulated by the controller. One table is the request table which serves as a master table and the second is a processing table which functions as a slave table. During the request phase, each I/F card that has data to be switched, sends a request to the controller. The format of the request can comprise any suitable means of indicating to the controller that the I/F card has data to pass to the switch and to which destination port. Note that up to N requests can be received by the controller in any single cycle. Two examples are described herein.

Figure 4:
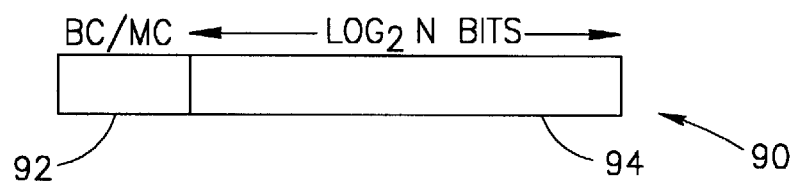
FIG. 4 is a diagram illustrating a first bit representation for transmitting I/F card destination data to the controller.

A diagram illustrating a first bit representation for transmitting I/F card destination data to the controller is shown in FIG. 4. The destination port is indicated in a message 90 that is comprised of two portions. The first portion 94 indicates which of the N ports, the data is destined to. Note that $\log_2 N$ bits are required to represent N output ports. Each request on a cell by cell basis is represented by a request message that is $\log_2 N+1$ bits wide. The destination port number is encoded as a binary value. The second portion is a BC/MC bit field 92. This field, when set, indicates that either a broadcast or a multicast cell is to be transmitted. Unicast is indicated by clearing the BC/MC bit and including a non zero value in the destination field 94. Broadcast is indicated by setting the BC/MC bit and zeroing the destination field 94. Multicast is indicated by setting the BC/MC bit, setting the destination field 94 to one of the destination ports of the multicast group. Additional messages 90 are required, one for each member of the multicast group.

Figure 5:
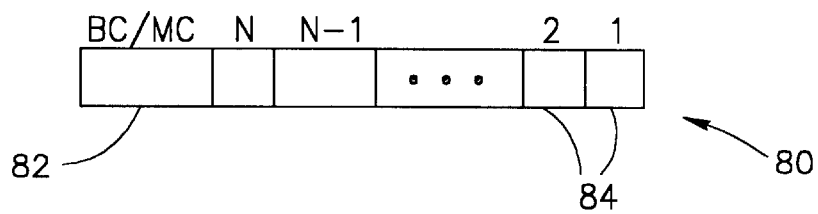
FIG. 5 is a diagram illustrating a second bit representation for transmitting I/F card destination data to the controller.

A diagram illustrating a second bit representation for transmitting I/F card destination data to the controller is shown in FIG. 5. In this case, the message 80 also comprises two portions. The first portion comprises N bits 84 wherein one of the bits is set indicating the destination port. Thus N bits are required to represent N destination ports. A BC/MC bit field 82 is set to indicate a broadcast or multicast cell. Unicast traffic is indicated by the BC/MC bit being clear and only one of N bits being set to indicate the destination port. Broadcast is indicated by setting the BC/MC bit and clearing all N destination port bits. Multicast is indicated by setting the BC/MC bit and setting one or more of the bits corresponding to the destination ports in the multicast group. The advantage of using this representation is that less processing needs to be performed by the controller, as each bit directly represents a bit position. A wider or faster bus, however, is necessary to implement this bit representation scheme.

The controller, upon receiving a request from an I/F card, stores the request in a request table. At the beginning of the processing phase, the controller copies the contents of the request table into the processing table and uses the processing table to determine the ACKs to return to the I/F cards. During the processing phase, additional requests are received and the request table is updated accordingly.

Figure 6:
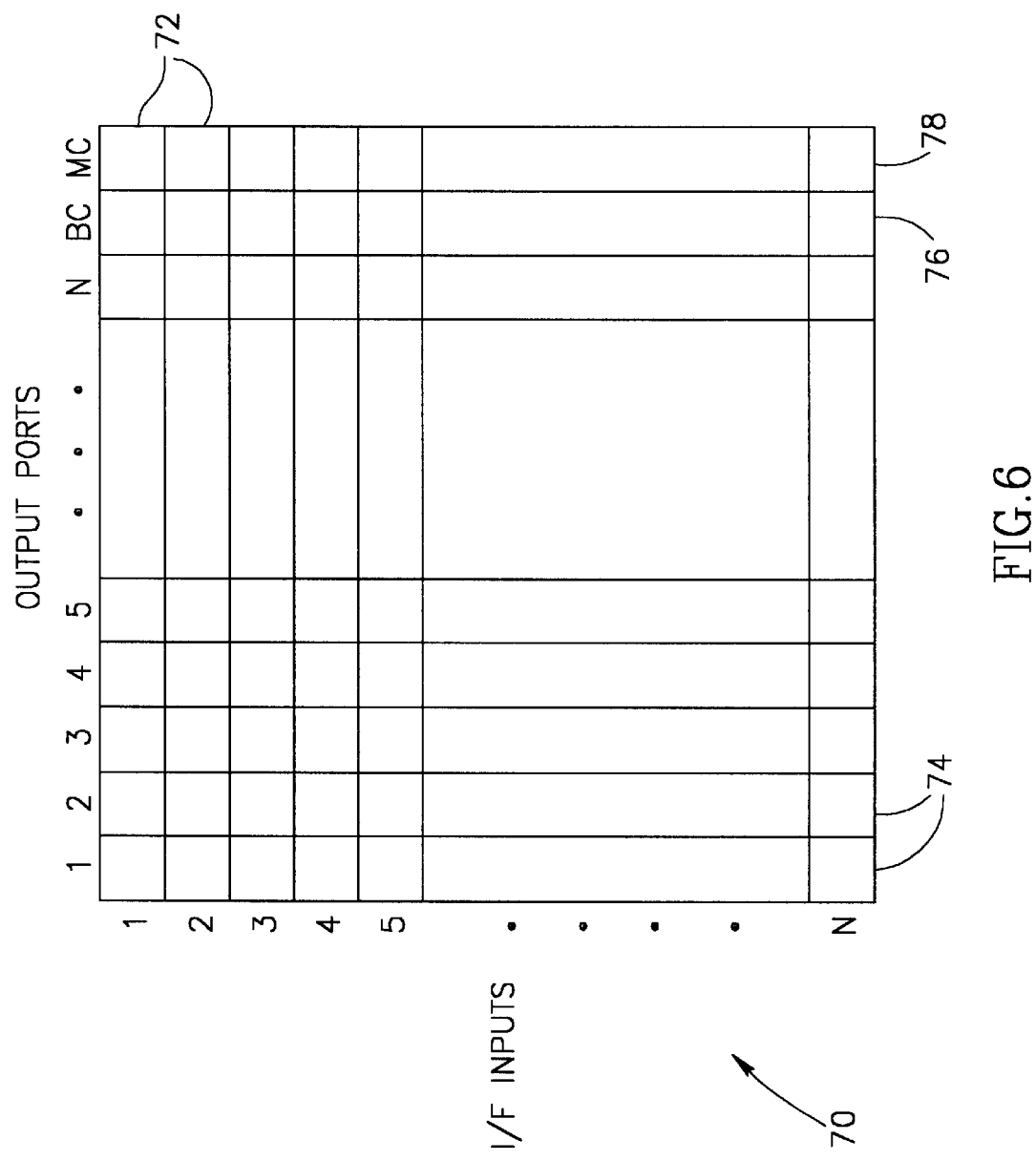
FIG. 6 is a table illustrating the structure of the request table and the processing table used by the controller in the switching matrix.

A table illustrating the structure of the request map table and the processing map table used by the controller in the switching matrix is shown in FIG. 6. Both the request and processing tables are constructed in the same manner. Each table, generally referenced 70, comprises N rows 72 by N unicast columns 74. The table also comprises a broadcast column 76 and a multicast column 78. Each element in both tables represents one bit. Setting a bit in the table indicates that a request has been received from a particular I/F card for a particular destination port.

In operation, requests arrive at the controller from the plurality of I/F cards. Each request is received, decoded and interpreted by the controller. A bit in the request table is set in the row corresponding to the I/F card and in the column corresponding to the requested destination port. The bit is cleared only when an ACK is sent to the I/F card designating that particular destination port. A cleared bit can also indicate that there is no request pending for a particular destination port. Note that each row in the request table can have multiple bits set simultaneously. Each bit set indicates a unicast destination port the particular I/F card wishes to send data to. In addition, each column can also have multiple bits set. Each bit indicates the I/F cards requesting to send unicast data to a particular destination port.

In the processing phase, the controller copies the current state of the request table into the processing table. The controller then works with the processing table rather than the request table. The controller functions to perform a two dimensional round robin in order to select the destination ports for each I/F card with a pending request. The selection begins with column 1. For each column, the rows are examined for the first encountered bit that is set. Once a set bit is found, the remaining bits in that row and column are cleared. This is done so as to disable other destination ports for that I/F card and to disable other I/F cards from being assigned that destination port.

Note that the same destination port cannot be assigned to more than one I/F card at a time. In addition, the same I/F card cannot output unicast data to more than one destination port at a time. Copying the contents of the request into the processing map table before each processing phase permits new requests received from interface cards to be entered into the request map table without interfering with the wavelength assignment of the I/F cards during the current process phase.

Once a bit is selected for a column, the controller continues with the next column examining each row for a bit that is set. Once found, all the remaining bits in that that row and column are cleared. This process continues for each column. During each processing cycle, the search through the rows for a particular column begins where the previous search left off. Note that other priority techniques for selecting the destination ports can be used without departing from the spirit and scope of the present invention.

During the acknowledgment phase, acknowledgements, i.e., ACK messages, are sent from the controller to each I/F card that got assigned a destination port. The ACK message indicates which of the destination ports has been assigned for the next cycle. In response, the I/F card configures the corresponding output queue to place its data into the switching matrix. Once a destination port is chosen, its corresponding bit in the request map table is cleared.

The above description applies to unicast transmission. Broadcast transmission is handled differently. When the controller encounters a bit set in the broadcast (BC) column, it clears all other bits in the table, including other bits set in the BC column. This is because no other I/F card can transmit data to a destination port when one of the I/F cards is in broadcast. Thus, it may be preferable if the controller check the BC column before examining bits in columns 1 through N. Once an I/F card is assigned a destination port, a broadcast request cannot be fulfilled.

In one embodiment, weights can be applied to the columns, giving some destination ports and broadcast/multicast requests priority over others. The weights are used to determine the order in which the controller examines the contents of the processing map table. Thus, the BC and MC columns can be assigned equal weight with the N destination ports or they can assigned higher weights giving them higher priority over the unicast requests.

Multicast is handled in a similar manner with the difference being that the controller does not clear the contents of the entire table but only bits in the particular row and in each column corresponding to members of the multicast group. Clearing the bits in other rows, prevents other I/F cards from sending unicast data to a destination port assigned to the multicast group. A multicast cell only needs to be forwarded to the destination ports corresponding to the members of the multicast group. The remaining destination ports are free to be assigned to other I/F cards.

When a set bit is encountered in the MC column, the controller refers to a separate multicast bit map associated with that particular I/F card to determine the destination ports that are to be included in the multicast group. The controller maintains N multicast bit maps, each one N bits wide and associated with a single I/F card. As described previously, the multicast bit map data can be forwarded to the controller using a single message that is N bits wide or using multiple $\log_2 N$ bit messages. In either case, the multicast bit map data is stored in the controller in N bit wide registers.

While the invention has been described with respect to a limited number of embodiments, it will be appreciated that many variations, modifications and other applications of the invention may be made.

What is claimed is:

1. A wavelength assignment apparatus for use in an optical switching matrix, said optical switching matrix having N input ports and N output destination ports, each input port having a corresponding interface card coupled thereto, said apparatus comprising:

a controller adapted to receive requests from said N interface cards, each request indicating that an interface card has data ready for input to said switching matrix, said controller adapted to output acknowledgements to said N interface cards, each acknowledgement indicating the designated wavelength and destination port assigned to the interface card;

a request map table for storing the plurality of requests received from said interface cards, a bit being set in said request map table to indicate a request for an interface card to send data to a particular destination port;

a processing map table for temporarily holding the current state of said request map table, the contents of said request map table periodically being copied to said processing map table; and said controller operative to assign said destination ports to said interface cards such that each interface card is assigned no more than one destination port and each destination port is assigned to no more than one interface card.

2. The apparatus according to claim 1, wherein said request map table and said processing map table comprise tables each of size N rows by N columns.

3. The apparatus according to claim 1, wherein said controller is adapted to receive said requests via a request bus N bits wide, each bit indicating a different destination port.

4. The apparatus according to claim 1, wherein said controller is adapted to receive said requests via a request bus $\log_2 N$ bits wide, each request comprising a value corresponding to a destination port.

5. The apparatus according to claim 1, wherein said controller is adapted to perform a two way round robin selection in assigning destination ports to said interface cards.

6. A wavelength assignment apparatus for use in an optical switching matrix, said optical switching matrix having N input ports and N output destination ports, each input port having a corresponding interface (I/F) card coupled thereto, said apparatus comprising:

a controller adapted to receive requests from said N I/F cards, each request indicating that an I/F card has data ready to input to said switching matrix, said controller adapted to output acknowledgements to said N I/F cards, each acknowledgement indicating the designated wavelength and destination port assigned to the I/F card;

a request map table for storing the plurality of requests received from said I/F cards, a bit being set in said request map table to indicate a request for an I/F card to send data to a particular destination port;

a processing map table for temporarily holding the current state of said request map table, the contents of said request map table periodically being copied to said processing map table;

said controller operative to assign said destination ports to said I/F cards such each I/F card is assigned no more than one destination port and each destination port is assigned to no more than one I/F card for unicast connections;

broadcast means adapted to assign a single I/F card a broadcast slot while preventing all other I/F cards from sending any data to said destination ports; and multicast means adapted to assign a multicast slot comprising a plurality of destination ports to a single I/F card while permitting any remaining destination ports to be assigned to other I/F cards.

7. The apparatus according to claim 6, wherein said request map table and said processing map table comprise tables N rows by N+2 columns, said $N+1^{th}$ column representing a broadcast column and said $N+2^{nd}$ column representing a multicast column.

8. The apparatus according to claim 6, wherein said controller is adapted to receive said requests via a request bus N+1 bits wide, N bits indicating a different destination port with the $N+1^{th}$ bit indicating a broadcast/multicast request.

9. The apparatus according to claim 6, wherein said controller is adapted to receive said requests via a request bus $\log_2 N$ bits wide, each request indicating the number corresponding to a destination port.

10. The apparatus according to claim 6, wherein said controller is adapted to receive a multicast bit map representing destination ports to be included in a multicast group.

11. The apparatus according to claim 6, wherein said controller is adapted to perform a two way round robin selection in assigning destination ports to said I/F cards.

12. The apparatus according to claim 6, wherein said controller is adapted to assign weights to said destination ports and to requests for broadcast and multicast connections.

13. In an optical switching matrix having N input ports and N output destination ports, each input port having a corresponding interface card coupled thereto, a method for assigning wavelengths to said input ports, said method comprising the steps of:

receiving one or more requests from said interface cards and storing them in a request map table, a bit being set in said request map table to indicate receipt of a request from an interface card to send data to a particular destination port;

copying the contents of said request map table to a processing map table at the beginning of each processing phase;

assigning a destination port to each requesting interface card such that each interface card is assigned no more than one destination port and each destination port is assigned to no more than one interface card; and removing the request for a particular destination port once it has been assigned to an interface card.

14. The method according to claim 13, wherein said step of assigning a destination port to each requesting interface card comprises the steps of:

performing a two way round robin technique through the columns and then rows of said processing map table to search for set bits; and clearing the remaining bits in the particular row and column once a set bit is found so as to prevent the same destination port from being assigned to another interface card.

15. The method according to claim 13, wherein said step of removing the request for a particular destination port comprises the step of clearing a bit in the request map table corresponding to the destination port assigned to a particular interface card.

* * * * *